3,034,964
SUSTAINED ACTION TABLET CONTAINING OXYTETRACYCLINE

Tsugio Hamada, Lexington, Pa., assignor, by mesne assignments, to Vitamix Pharmaceuticals Incorporated, Philadelphia, Pa., a corporation of Pennsylvania
No Drawing. Filed Mar. 29, 1954, Ser. No. 419,567
1 Claim. (Cl. 167—82)

My invention relates to therapeutic compositions and articles and relates in particular to compositions and articles for oral administration in the form of tablets and to methods of making the same.

It is considered desirable to administer certain therapeutic agents in such a manner as to afford a sustained level of the drug into the body fluids over a substantial period of time. It is of importance that a temporary excess level be not administered at frequent intervals of time.

Accordingly, it is a general object of my invention to provide for the oral administration of therapeutic agents in a tablet form so that the agents will be carried through the acid and alkaline regions of the digestive tract.

It is another object of my invention to provide for the oral administration of a therapeutic agent in a tablet form so that the tablet will be carried through the stomach and intestines meanwhile releasing the therapeutic agent or agents at a constant or fairly constant rate.

Referring now to a specific embodiment of my invention wherein a tablet is made which will disintegrate over a period of time, I combine the following ingredients:

Granulation A

| | Milligrams |
|---|---|
| Oxytetracycline | 75 |
| Starch | 125 |

Ethyl cellulose solution in quantity sufficient to dampen.

Granulation B

| | Milligrams |
|---|---|
| Oxytetracycline | 75 |
| Starch | 50 |
| Powdered sugar | 50 |

Ethyl cellulose solution in quantity sufficient to dampen.

Granulation C

| | Milligrams |
|---|---|
| Oxytetracycline | 100 |
| Starch | 50 |
| Hydrogenated castor oil | 75 |

Oxytetracycline is an antibiotic substance obtained from *Streptomyces rimosus*, such as that sold under the trademark "Terramycin." See Antibotics and Chemotherapy, July 1953, pages 659 to 662—About the Chemically Descriptive Generic Term for Aureomycin (Chlortetracycline) and Terramycin (Oxytetracycline).

Hydrogenated castor oil is a synthetic wax-like compound obtained by the controlled hydrogenation of pure selected castor oil, such as that sold under the trademark "Castorwax" by the Baker Castor Oil Company of New York, N.Y.

Ethyl cellulose is an ethyl ether of cellulose prepared by the reaction of ethyl chloride and alkali cellulose, such as that sold under the trademark "Ethocel." See The Merck Index of Chemicals and Drugs, 1952 edition, pages 405, 408 and 409.

The quantity of Granulation A is mixed thoroughly and dampened with the required amount of prepared ethyl cellulose solution. The mixture is then dried and when completely dry, sieved through a #12 mesh screen.

The desired amount of Granulation B is mixed thoroughly and dampened again with ethyl cellulose solution. It is dried and sieved through a #14 mesh screen.

In Granulation C, the hydrogenated castor oil and the alcohol is heated to form a solution. The starch and oxytetracycline are then added to the solution and mixed thoroughly. The mixture is then dried, granulated through a #14 sieve.

When Granulations A, B, and C are combined, they equal one tablet. Granulations A, B, and C, when mixed together, are compressed into a tablet.

Granulation C is mixed and heated. However, Granulations A and B are not heated.

Although my invention has been described in considerable detail, such description is intended as being illustrative rather than limiting, since the invention may be variously embodied, and the scope of the invention is to be determined as claimed.

I claim as my invention:

An integral tablet to offer a sustained level of a drug to be carried into the body over a substantial period of time comprising an ingredient intermixture of oxytetracycline, hydrogenated castor oil as a vehicle for the oxytetracycline, starch as a disintegrating agent for the vehicle in sufficient quantity to enable release of the oxytetracycline into the body fluids at a controlled rate, ethyl cellulose, and powdered sugar.

References Cited in the file of this patent

UNITED STATES PATENTS

| | | |
|---|---|---|
| 2,449,039 | Libby | Sept. 7, 1948 |
| 2,487,336 | Hinds | Nov. 8, 1949 |
| 2,566,200 | Hickey | Aug. 28, 1951 |
| 2,673,838 | Veatch | Mar. 30, 1954 |

FOREIGN PATENTS

| | | |
|---|---|---|
| 507,692 | Belgium | June 9, 1952 |

OTHER REFERENCES

Bennett: "Commercial Waxes," Chemical Pub. Co., New York, 1944, pages 112, 113, 116.

Parsons: "Use of Antacids to Control Nausea and Vomiting Caused by Terramycin," Proc. Staff Meet. Mayo Clinic, July 4, 1951, pp. 260–263.

J.A.P.A., Pract. Pharm. Ed., March 1948, p. 191.
J.A.P.A., Pract. Pharm. Ed., January 1950, p. 50.
J.A.P.A., Pharm. Abstra., January 1946, p. 4, "Penicillin—Oral."

Seeberg et al.: "Calcium Carbonate as an Antacid for Oral Penicillin," Science, August 31, 1945, pp. 225–227.